(12) United States Patent
Gstoettenbauer et al.

(10) Patent No.: US 10,970,163 B2
(45) Date of Patent: *Apr. 6, 2021

(54) FREQUENCY SIGNAL GENERATOR, A FREQUENCY MODULATED CONTINUOUS WAVE RADAR SYSTEM AND A METHOD FOR GENERATING A FREQUENCY SIGNAL

(71) Applicant: Infineon Technologies AG, Neubiberg (DE)

(72) Inventors: Bernhard Gstoettenbauer, Engerwitzdorf (AT); Klemens Kordik, Linz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,249

(22) Filed: Sep. 20, 2019

(65) Prior Publication Data

US 2020/0012556 A1 Jan. 9, 2020

Related U.S. Application Data

(63) Continuation of application No. 13/930,132, filed on Jun. 28, 2013, now Pat. No. 10,459,784.

(51) Int. Cl.
G06F 11/10 (2006.01)
(52) U.S. Cl.
CPC ................. *G06F 11/1004* (2013.01)
(58) Field of Classification Search
CPC .................................................. G06F 11/1004
USPC ........................................................ 714/807
See application file for complete search history.

(56) References Cited

U.S. PATENT DOCUMENTS

| | | | |
|---|---|---|---|
| 4,476,445 A | 10/1984 | Riley, Jr. |
| 4,890,071 A | 12/1989 | Curtis |
| 4,965,533 A | 10/1990 | Gilmore |
| 5,122,756 A | 6/1992 | Nelson |
| 5,230,097 A | 7/1993 | Currie |
| 5,416,779 A | 5/1995 | Barnes |
| 5,535,229 A | 7/1996 | Hain, Jr. |
| 6,965,616 B1 | 11/2005 | Quigley |
| 7,196,562 B1 | 3/2007 | Luis |
| 7,492,228 B2 | 2/2009 | Strange |
| 7,681,103 B2 | 3/2010 | Devadas |

(Continued)

OTHER PUBLICATIONS

ISO 26262-1 Road vehicles—Functional safety, Part I : Vocabulary, Dated Nov. 15, 20II, 32 pages.

(Continued)

*Primary Examiner* — Albert Decady
*Assistant Examiner* — Enam Ahmed
(74) *Attorney, Agent, or Firm* — Eschweiler & Potashnik, LLC (57) ABSTRACT

A frequency signal generator includes a controllable oscillator unit, a frequency control unit and an error detection unit. The controllable oscillator unit generates and provides a frequency signal. The frequency control unit generates a frequency control signal and the controllable oscillator unit varies a frequency of the frequency signal based on the frequency control signal. Further, the error detection unit receives the frequency control signal, detects an error within the frequency control signal and provides an error signal. The error signal comprises information on a detected error.

20 Claims, 4 Drawing Sheets

(56) References Cited

U.S. PATENT DOCUMENTS

| | | | |
|---|---|---|---|
| 8,069,402 B2 * | 11/2011 | Myers | H04L 27/233 714/807 |
| 2003/0103590 A1 | 6/2003 | Budde | |
| 2007/0024425 A1 | 2/2007 | Nitzan | |
| 2008/0094147 A1 | 4/2008 | Olsson | |
| 2008/0157881 A1 | 7/2008 | Dent | |
| 2010/0146374 A1 * | 6/2010 | Samuelson | G01M 3/243 714/807 |
| 2010/0213993 A1 | 8/2010 | Hongo | |
| 2011/0016374 A1 | 1/2011 | Grivna | |
| 2011/0131468 A1 | 6/2011 | Myers | |
| 2012/0144279 A1 * | 6/2012 | Rabeler | G06F 11/1004 714/807 |
| 2012/0166918 A1 | 6/2012 | Svendsil | |
| 2012/0254676 A1 * | 10/2012 | Hirairi | G06F 11/1008 714/704 |
| 2014/0006908 A1 * | 1/2014 | Gruber | H03M 13/09 714/776 |
| 2015/0193321 A1 | 7/2015 | Ngo | |

OTHER PUBLICATIONS

ISO 26262-2 Road vehicles—Functional safety, Part 2: Management of Functional Safety, Dated Nov. 15, 2011, 36 pages.

ISO 26262-3 Road vehicles—Functional safety, Part 3: Concept Phase, Dated Nov. 15, 2011, 32 pages.

ISO 26262-4 Road vehicles—F unctional safety, Pa rt 4: Product Development at the System Level, Dated Nov. 15, 2011, 48 pages.

ISO 26262-5 Road vehicles—F unctional safety, Part 5: Product Development at the Hardware Level, Dated Nov. 15, 2011, 86 p ages.

ISO 26262-6 Road vehicles—Functional safety, Pa rt 6: Product Development at the Software Level, Dated Nov. 15, 2011, 52 pages.

ISO 26262-7 Road vehicles—Functional safety, Part 7: P roduction and Operation, Dated Nov. 15, 20II, 20 pages.

ISO 26262-8 Road vehicles—Functional safety, Part 8: Supporting Processes, Dated Nov. 15, 2011, 60 pages.

ISO 26262-9 Road vehicles—Functional safety, Part 9: Automotive Safety Integrity Level (ASIL)-Oriented and Safety-Oriented Analyses, Dated Nov. 15, 2011, 25 pages.

ISO 26262-1 0 Road vehicles—Functional safety, Part 10: Guideline on ISO 26262, © 2012, 96 pages.

Non-Final Office Action dated Jul. 7, 2015 in connection with U.S. Appl. No. 13/930,132.

Non-Final Office Action dated Feb. 16, 2016 in connection with U.S. Appl. No. 13/930,132.

Non-Final Office Action dated Aug. 11, 2016 in connection with U.S. Appl. No. 13/930,132.

Non-Final Office Action dated Feb. 10, 2017 in connection with U.S. Appl. No. 13/930,132.

Non-Final Office Action dated Sep. 6, 2017 in connection with U.S. Appl. No. 13/930,132.

Non-Final Office Action dated Apr. 9, 2018 in connection with U.S. Appl. No. 13/930,132.

Non-Final Office Action dated Oct. 30, 2018 in connection with U.S. Appl. No. 13/930,132.

Non-Final Office Action dated Apr. 4, 2019 in connection with U.S. Appl. No. 13/930,132.

Notice of Allowance dated Jun. 27, 2019 in connection with U.S. Appl. No. 13/930,132.

\* cited by examiner

FREQUENCY SIGNAL GENERATOR, A FREQUENCY MODULATED CONTINUOUS WAVE RADAR SYSTEM AND A METHOD FOR GENERATING A FREQUENCY SIGNAL

REFERENCE TO RELATED APPLICATION

This application is a continuation of U.S. application Ser. No. 13/930,132 filed on Jun. 28, 2013, the contents of which are incorporated by reference in their entirety.

FIELD

Embodiments relate to the field of electrical signal generation and in particular to a frequency signal generator, a frequency modulated continuous wave radar system and a method for generating a frequency signal.

BACKGROUND

Electrical signals can be generated in various ways and with a large variety of properties. Nowadays, phase locked loops (PLL) are often used for signal generation (e.g. generation of local oscillator signals, clock signals or carrier signals). For example, phase locked loops in combination with voltage controlled oscillators (VCO) may be used in the area of frequency modulated continuous wave radar systems (FMCW).

The implementation of new safety standards (e.g. for road vehicles) implicate new safety requirements also for electronic systems (e.g. radar systems), for example. Therefore, a continuing improvement of the reliability and safety of use of electronic systems is desired.

SUMMARY

A frequency signal generator according to an embodiment comprises a controllable oscillator unit, a frequency control unit and an error detection unit. The controllable oscillator unit is configured to generate and provide a frequency signal. The frequency control unit is configured to generate a frequency control signal. Further, the controllable oscillator unit is configured to vary a frequency of the frequency signal based on the frequency control signal. The error detection unit is configured to receive the frequency control signal and detect an error within the frequency control signal. Further, the error detection unit is configured to provide an error signal comprising information on a detected error.

Due to the error detection unit analyzing the frequency control signal, an erroneous driving or triggering of the controllable oscillator unit by the frequency control signal can be detected very early. Further, such an error may be detectable with low effort, since the frequency control signal can be analyzed more easy than the frequency signal generated by the controllable oscillator unit, which often comprises very high frequencies. By implementing the proposed error detection, the reliability of the frequency signal generator and/or the safety of use of devices using a proposed frequency signal generator can be improved.

In some embodiments, the error detection unit comprises a comparison unit and a hash value generator. The hash value generator is configured to generate characteristic hash values based on the frequency control signal. Further, the comparison unit is configured to compare the characteristic hash values with reference comparison information or reference hash values. In this way, an error in the frequency control signal can be detected with high probability and low effort.

Some embodiments relate to a frequency modulated continuous wave radar system comprising a frequency signal generator according to the proposed concept.

Such a radar system can provide high reliability and/or improved safety of use due to the implemented error detection.

BRIEF DESCRIPTION OF THE FIGURES

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
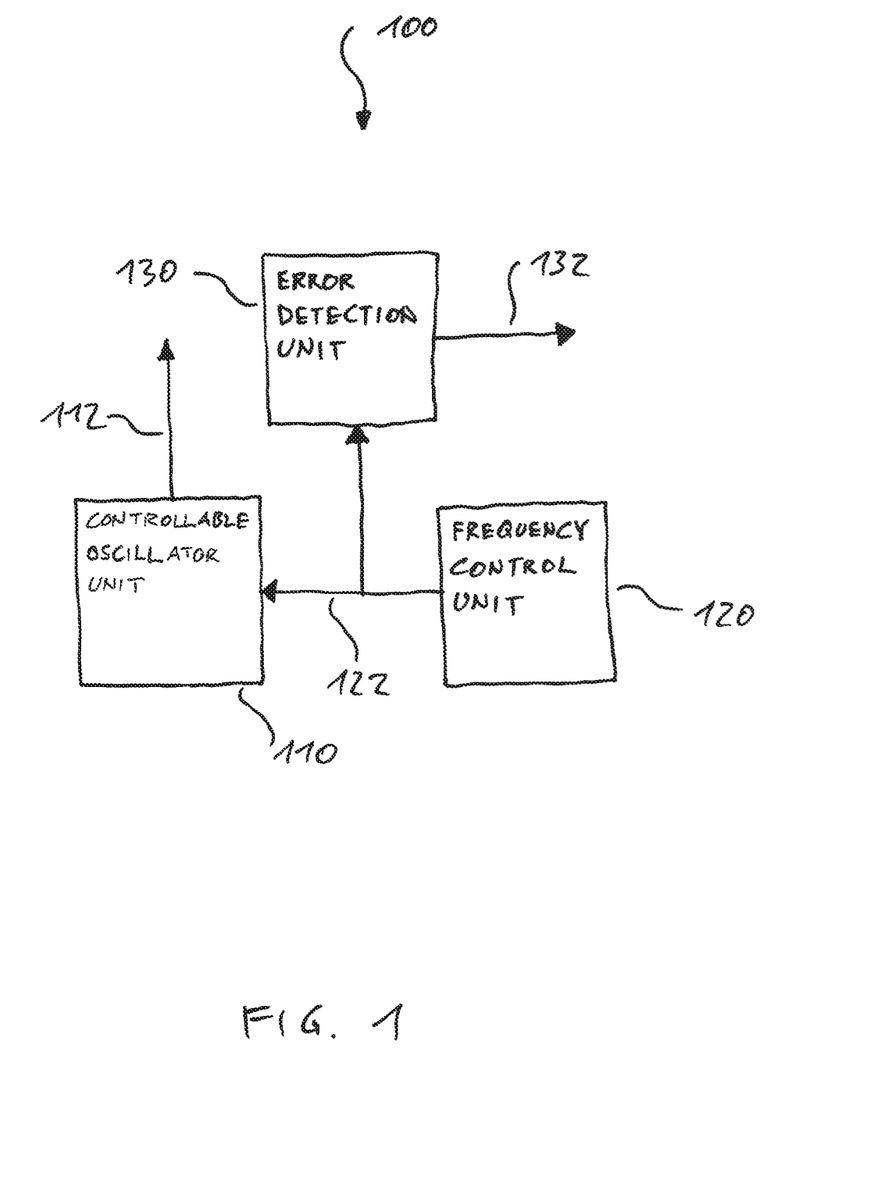
FIG. 1 shows a block diagram of a frequency signal generator.

FIG. 1 shows a block diagram of a frequency signal generator 100 according to an embodiment. The frequency signal generator 100 comprises a controllable oscillator unit 110, a frequency control unit 120 and an error detection unit 130. The frequency control unit 120 is connected to the controllable oscillator unit 110 and the error detection unit 130. The controllable oscillator unit 110 generates and provides a frequency signal 112. The frequency control unit 120 generates a frequency control signal 122 and the controllable oscillator unit 110 varies a frequency of the frequency signal 112 based on the frequency control signal 122. Further, the error detection unit 130 receives the frequency control signal 122 and detects an error (or a fault or a failure) within the frequency control signal 122. Additionally, the error detection unit 130 provides an error signal 132 comprising information on a detected error.

Due to the error detection unit 130 analyzing the frequency control signal 122, an erroneous driving or triggering of the controllable oscillator unit by the frequency control signal can be detected very early. Further, such an error may be detectable with low effort, since the frequency control signal 122 can be analyzed more easy than the frequency signal 112 generated by the controllable oscillator unit 110. By implementing the proposed error detection, the reliability of the frequency signal generator 100 and/or the safety of use of devices using a proposed frequency signal generator 100 can be improved.

The frequency signal generator 100 is an electronic device capable of generating and providing an electrical signal with specific properties regarding at least a frequency portion of the signal. An electrical signal with such properties is the frequency signal 112 to be generated by the controllable oscillator unit 110.

The frequency signal 112 may be an electrical signal with only one frequency component, which is variable over time, or a signal with a plurality of frequency components within different frequency bands or with one or more different frequencies at the same time, while one or more of the different frequency components may be variable over time. The frequency signal 112 may also be called oscillator signal, local oscillator signal, clock signal or carrier signal. In the following, the frequency signal 112 may comprise only one frequency component with only one frequency at (the same) a time with low tolerance (e.g. less than 1%, less than 0.1% or less than 0.01% of the one frequency of the frequency signal), which can be varied based on the frequency control signal 122, although also other frequency signals (e.g. with more frequency portions) may be generated by the frequency signal generator, for example.

By varying the frequency of the frequency signal 112 based on the frequency control signal 122, the frequency signal 112 may be a digital signal (or an analog signal) and may be frequency modulated or varied according to a predefined frequency characteristic or a predefined frequency ramp (e.g. saw tooth shaped or sinusoidal). In other words, the frequency signal 112 can be generated with a controlled varied signal frequency, for example.

The controllable oscillator unit 110 is able to provide such a frequency signal 112 with high accuracy.

The controllable oscillator unit may comprise any kind of oscillator controllable by a control signal in order to vary a frequency of the signal generated by the oscillator. Optionally, the controllable oscillator unit 110 generates and provides a frequency signal 112 based on the reference frequency signal 102 so that the phase of the frequency signal 112 is aligned to a phase of the reference frequency signal 102. In this example, the controllable oscillator unit may also be called phase locked loop unit.

By using a feedback loop, the controllable oscillator unit may be able to align the phase of the frequency signal 112 to a phase of a reference frequency signal 102. The phase of the frequency signal 112 may be aligned or adjusted to the phase of the reference frequency signal 102, if the phase of the frequency signal comprises the same phase as the reference frequency signal 102 or comprises a predefined phase offset (e.g. 90°, 120°, 180°, 270° or another offset) to the phase of the reference frequency signal 102. In this connection, a deviation of less than 5°, less than 1° or less than 0.1° from the predefined phase offset may be neglected (e.g. depending on the quality of the controllable oscillator unit).

The reference frequency signal 102 may be provided by an arbitrary source of electrical signals (e.g. depending on the device using the frequency signal generator). For example, the frequency signal generator may be used to track a reference frequency signal 102 or it may generate a frequency signal comprising a frequency that is a multiple of the frequency of the reference frequency signal 102. For example, a reference oscillator may generate the reference frequency signal 102 with high accuracy (e.g. a quartz oscillator) in comparison to a voltage controlled oscillator. This reference frequency signal 102 may be used by the controllable oscillator unit 110 to generate the frequency signal 112 with a frequency being a multiple of the frequency of the reference frequency signal 102 so that the frequency signal 112 also may provide a highly accurate frequency behavior. The reference oscillator may be an external oscillator or part of the frequency signal generator 100.

The frequency control unit 120 generates a frequency control signal capable of driving the controllable oscillator unit 110 so that the frequency of the frequency signal 112 is varied according to the frequency control signal 122 (e.g. according to information, values or trigger pulses contained by the frequency control signal). This may be done in various ways.

For example, the frequency control unit 120 may provide the frequency control signal 122 to a variable frequency divider or a variable voltage controlled oscillator of the controllable oscillator unit 110 causing a variation of the frequency of the frequency signal 112 (e.g. at least the frequency of at least one frequency portion of the frequency signal). In this way, the frequency signal 112 may be frequency modulated or the frequency of the frequency signal 112 may be varied according to a predefined frequency characteristic or frequency ramp.

The error detection unit 130 may analyze the frequency control signal 122 in order to detect an error within the frequency control signal 122. The error detection unit 122 may be implemented so that it is capable of detecting at least one type of possible failure types with at least a predefined probability. Depending on the efforts spent for the error detection unit 130, the number of detectible failure types and/or the probability of detecting a specific failure type may be higher or lower so that the effort can be adapted to the desired failure detection capability.

The error detection unit 130 further provides an error signal 132 indicating detected errors. The information contained by the error signal 132 may simply indicate whether an error is detected or not or it may contain more specific information (e.g. information on failure type, occurrence time of failure and/or other failure characteristics).

The error signal 132 may be optionally used to trigger a warning for a user, trigger failure correction mechanisms and/or switch the frequency signal generator to a safe state (e.g. the generated frequency signal is not used anymore or only used for restricted applications with low safety requirements), if the error signal 132 indicates a detected error.

The controllable oscillator unit 110 may be implemented in various ways. The controllable oscillator unit 110 may be a control system that generates a frequency signal 112 or output signal whose phase relates to a phase of a reference frequency signal 102 or reference input signal. The controllable oscillator unit 110 may be an electronic circuit comprising a variable frequency oscillator and a phase detection unit. The phase detection unit may compare the phase of the reference frequency signal 102 with the phase of the frequency signal 112 generated by the variable frequency oscillator and adjust the frequency or the phase of the frequency signal 112 generated by the variable frequency oscillator to keep the phases aligned or matched. The signal (e.g. alignment deviation signal) from the phase detection unit may be used to control the variable frequency oscillator in a feedback loop.

Frequency is the time derivative of phase. Aligning the phase of the frequency signal to the phase of the reference frequency signal in a locked state may imply keeping the frequency of the reference frequency signal and the frequency of the frequency signal in a predefined relation, for example.

Optionally, alternatively or additionally to one or more aspects mentioned above, the controllable oscillator unit 110 may comprise a frequency divider unit. This frequency divider unit may generate a divided frequency signal based on the frequency signal 112 provided by the controllable oscillator unit 110 so that the divided frequency signal comprises a frequency equal to a frequency of the frequency signal 112 provided by the controllable oscillator unit 110 divided by a variable factor (e.g. an integer or a decimal number). Further, the frequency divider unit may be able to vary the variable factor based on the frequency control signal 122 provided by the frequency control unit 120. Further, the controllable oscillator unit 110 may vary the frequency of the frequency signal 112 based on the divided frequency signal generated based on the variable factor. In this way, a variation of the frequency of the frequency signal 112 can easily be triggered by the frequency control unit 120.

The frequency divider unit may be implemented in various ways. For example, the frequency divider unit may comprise a plurality of different frequency dividers selectable through a multiplexer controllable by the frequency control signal 122.

Optionally, the divided frequency signal can be fed back to the frequency control unit 120 so that the frequency control unit 120 can consider the divided frequency signal for generating the frequency control signal 122. In other words, the frequency control unit 120 may generate the frequency control signal 122 based on the divided frequency signal generated by the frequency divider unit. In this way, deviations from a desired frequency characteristic can be considered for controlling the variation of the variable fact or used by the frequency divider unit.

The frequency divider unit may be connected to a variable frequency oscillator of the controllable oscillator unit 110 in order to receive the frequency signal 112 and may be connected to a phase detection unit of the controllable oscillator unit 110 in order to provide the divided frequency signal to the phase detection unit, for example.

As already mentioned, the controllable oscillator unit 110 may comprise a phase detection unit. The phase detection unit may generate an alignment deviation signal based on a comparison of the reference frequency signal 102 and the divided frequency signal provided by the frequency divider unit. The alignment deviation signal may comprise information on a deviation of the alignment of the phase of the frequency signal 112 to the phase of the reference frequency signal 102. The alignment deviation signal may be provided to a variable frequency oscillator of the controllable oscillator unit 110 in order to correct a deviation of the alignment of the phases of the signals. In this way, the frequency signal 112 can be provided with a highly accurate predefined frequency behavior. Alternatively, the phase detection unit may generate a similar signal useable for controlling a variable frequency oscillator, for example.

The controllable oscillator unit 110 may comprise a variable frequency oscillator implemented in various ways. For example, the variable frequency oscillator may be an analog or a digital oscillator. For example, the controllable oscillator unit 110 may comprise a voltage controlled oscillator. Such an oscillator may be able to vary the frequency of an output signal based on a provided voltage signal. In other words, the voltage controlled oscillator of the controllable oscillator unit 110 may generate the frequency signal 112 based on the alignment deviation signal provided by the phase detection unit, for example.

Optionally, additionally or alternatively to one or more aspects mentioned above, the controllable oscillator unit 110 may comprise a filter unit. The filter unit may lowpass filter the alignment deviation signal generated by the phase detection unit and provide the filtered alignment deviation signal to the voltage controlled oscillator for generating the frequency signal 112 based on the filtered alignment deviation signal. In other words, a filter unit may be arranged between the phase detection unit and the voltage controlled oscillator of the controllable oscillator unit 110 in order to lowpass filter the deviation correction signal driving the voltage control oscillator. In this way, fast varying frequencies of phases occurring in the frequency signal 112 and detected by the phase detection unit may be removed from the alignment deviation signal (e.g. occurring during start or power up of the frequency signal generator).

The frequency control unit 120 may trigger a large variety of frequency characteristics or frequency modulations of the generated frequency signal 112 by providing a corresponding frequency control signal 122. A currently desired frequency characteristic or frequency modulation may be specified by at least one frequency modulation parameter (e.g. frequency variation speed or frequency variation amplitude). In other words, the frequency control unit 120 may generate the frequency control signal 122 based on at least one frequency modulation parameter so that the controllable oscillator unit 110 generates the frequency signal 112 with a predefined frequency characteristic or a predefined frequency modulation specified by the at least one frequency modulation parameter. In this way, different predefined frequency characteristics or frequency modulations of the frequency signal 112 can be provided by the frequency signal generator 100. Alternatively, the frequency signal generator 100 may only generate a frequency signal with one fixed frequency modulation or frequency characteristic so that the frequency control unit 120 can be implemented with low efforts (e.g. without a circuitry for triggering different modulations by different frequency modulation parameters).

As already mentioned the error detection unit 130 may be implemented in various ways. For example, the error detection unit 130 may comprise a comparison unit. The comparison unit may compare the frequency control signal 122 or comparison information derived from the frequency control signal 122 with a reference comparison signal or reference comparison information.

For example, the comparison unit may compare the frequency control signal 122 with a reference comparison signal represented by a stored version of the frequency control signal (e.g. stored by an internal or external memory unit). In this way, each error may be detectable, although the required memory space may be high.

Alternatively, the error detection unit may comprise a further (second) frequency control unit (e.g. being equal to the first frequency control unit providing the frequency control signal). The further frequency control unit may generate a further frequency control signal representing the reference comparison signal. The further frequency control signal may be generated so that it is equal to the frequency control signal 122 generated by the first frequency control unit 120, if no error occurs. By comparing the frequency control signal 122 and the further frequency control signal, a large variety of failure types may be detectible with high probability (e.g. a malfunction of one of the frequency control units). However, an error within signals driving the frequency control units may not be detected and the hardware effort may be high due to the further frequency control unit.

Further alternatively, the error detection unit 130 may comprise a hash value generator. The hash value generator may generate a comparison information by determining characteristic hash values (e.g. a characteristic bit sequence or a matrix of characteristic values) based on the frequency control signal 122. The comparison unit may compare this characteristic hash with reference comparison information in order to detect an error within the frequency control signal 122.

The comparison unit may receive reference comparison information indicating reference hash values corresponding to the determined characteristic hash value from a memory unit or may calculate such a reference hash values corresponding to the determined characteristic hash values based on a predefined function. Afterwards, the error detection unit 130 may generate the error signal 132 indicating an error, if the determined characteristic hash values are unequal to the reference hash values, for example.

In this way, an error detection mechanism may be implemented with low effort and high probability of detecting errors. The characteristic hash values may be values determined by the hash value generator based on a corresponding hash function. A hash function is an algorithm that maps large data sets of variable or fixed length to smaller data sets of fixed length, for example. For example, a hash function is a mathematical function which maps values from a large domain into a smaller range. An example may be a hash algorithm dividing a binary file into a collection of smaller pieces and performing a cumulative exclusive OR-function between successive pieces producing a hash that is smaller than the original data. Changing a single bit in the original message may produce very different hash values so that the hash values are characteristic for the input data. In other words, the determined characteristic hash values may be characteristic for the frequency control signal 122 provided by the frequency control unit 120. Depending on the complexity of the hash function, a desired probability of error detection can be obtained.

For example, the hash value generator may determine the characteristic hash values based on a cycled redundancy check algorithm (e.g. CRC16 may provide a probability of error detection of more than 99.99%) or another hash algorithm.

As already mentioned, optionally a memory unit may store reference hash values corresponding to determined characteristic hash values and provide this reference hash values to the comparison unit. The memory unit may be an internal memory unit of the frequency signal generator 100 or an external memory unit providing the reference hash values to the frequency signal generator. For example, the memory unit may optionally store a plurality of reference hash values corresponding to a plurality of different predefined frequency characteristics of the frequency signal 112 to be generated. In this example, the memory unit provides reference hash values of the plurality of reference hash values to the comparison unit based on at least one frequency modulation parameter indicating a predefined frequency characteristic of the plurality of different predefined frequency characteristics. Optionally, this at least one frequency modulation parameter may also be used by the frequency control unit 120 for selecting a predefined frequency characteristic or frequency modulation. In this way, the frequency signal generator 100 may be able to provide frequency signals 112 with different frequency characteristics or frequency modulations selectable by the at least one frequency modulation parameter. Further, independent on the selected frequency characteristic or frequency modulation, an error detection can be performed, for example.

Figure 2:
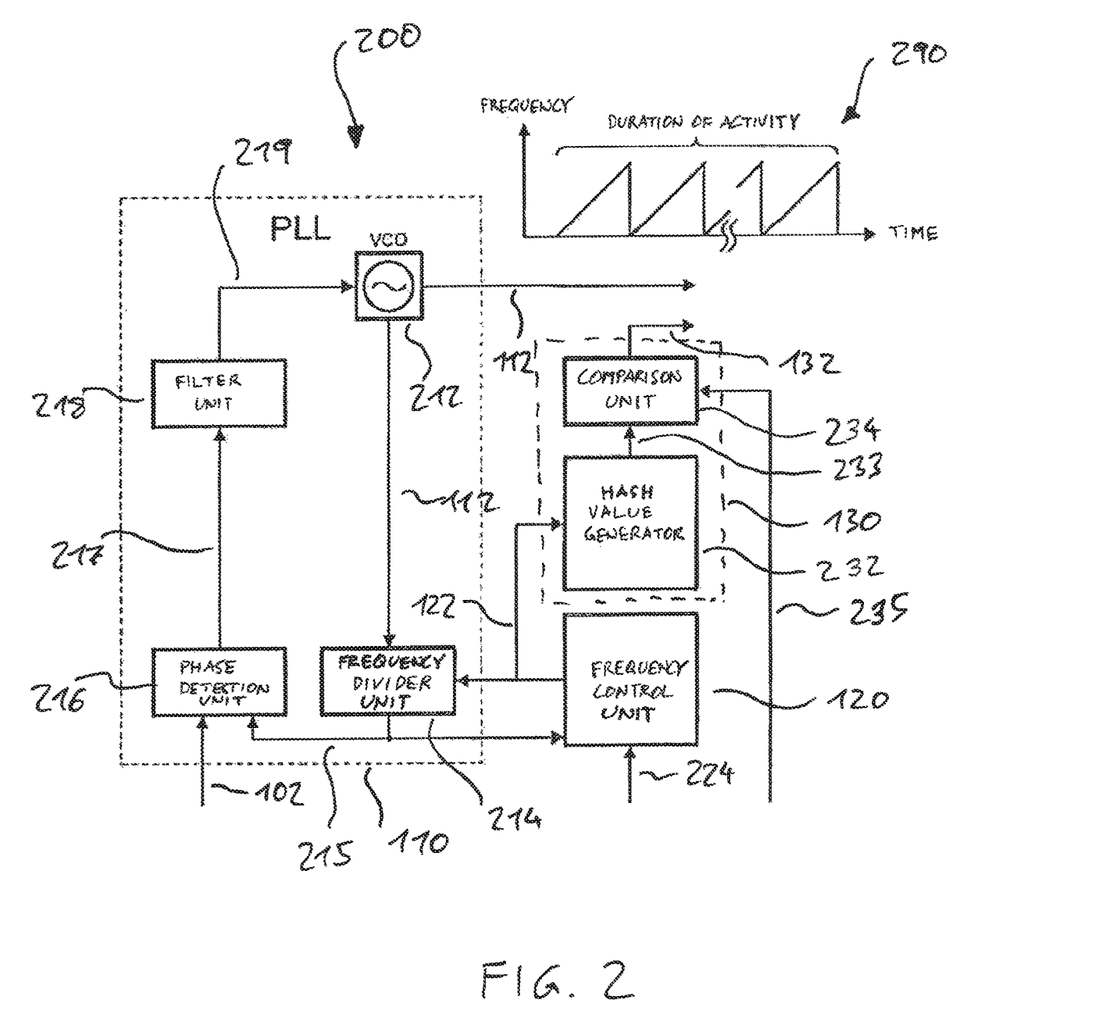
FIG. 2 shows a block diagram of another frequency signal generator.

FIG. 2 shows a block diagram of a frequency signal generator 200 according to an embodiment. In this example, the controllable oscillator unit 110 (PLL) comprises a voltage control oscillator 212 connected to a frequency divider unit 214. Further, the controllable oscillator unit 110 comprises a phase detection unit 216 connected to the voltage controlled oscillator 212 through a filter unit 218 (e.g. loop filter). The frequency divider unit 214 divides the frequency of the frequency signal 112 (e.g. PLL output, FMCW) provided by the voltage control oscillator 212 by a variable factor and provides the divided frequency signal 215 to the phase detection unit 216 and the frequency control unit 120 (e.g. for fine tuning or timing of the frequency control unit without influencing the hash values) as also mentioned above. Further, the phase detection unit 216 compares the reference frequency signal 102 (e.g. reference clock) with the divided frequency signal 215 in order to generate an alignment deviation signal 217 as also mentioned above. The alignment deviation signal 217 is lowpass filtered by the filter unit 218 and the filtered alignment deviation signal 219 is provided to the voltage controlled oscillator 212. The frequency control unit 120 (e.g. ramp generator) generates a frequency control signal 122 based on the divided frequency signal 215 and at least one frequency modulation parameter 224 (e.g. frequency ramp parameter) and provides the frequency control signal 122 to the frequency divider unit 214 of the controllable oscillator unit 110 and the error detection unit 130. The error detection unit 130 comprises a hash value generator 232 connected to a comparison unit 234. The hash value generator 232 generates characteristic hash values based on the frequency control signal 122 and the comparison unit 234 compares the determined characteristic hash values with the reference hash values 235 (e.g. expected hash value) in order to generate the error signal 132 (e.g. for display of status or safe state) as also mentioned above.

Optionally, the frequency modulation parameters 224 may further comprise additional information or parameters (e.g. amplitude information, amplification information or synchronization information), which may also be analyzed by the error detection unit 130 in order to detect an error within these parameters.

FIG. 2 further indicates a possible frequency characteristic or frequency modulation represented by the frequency over time diagram 290 in the upper right corner. In this example, the frequency is saw tooth shaped controlled. The frequency increases over a predefined time interval and is then reduced to the start frequency followed by a further increase of the frequency and so on. Alternatively, also an arbitrary number of other frequency characteristics or frequency modulations may be generated by a proposed frequency signal generator.

Some embodiments relate to an apparatus and a method for safe operation of a frequency ramp generator for a phase locked loop. Such a concept may be used for checking or testing the correct control or drive of a frequency divider (e.g. the output of a ramp unit or a frequency control unit).

According to an embodiment, the control signals of the frequency divider (output of the ramp unit or frequency control unit) are tapped for the whole duration of the activity (e.g. ramp sequence) and may be used for the calculation of hash values. This hash value may be unique for the required ramp sequence and may deviate with very high probability from the expected result, if an error occurs within the ramp unit (or frequency control unit). The probability depends on the length of the hash values and from the selected method for calculating them, for example. One possibility for calculating the hash values may be the usage of Cyclic Redundancy Code (CRC).

Additional to the correct function of the ramp unit also the correct control or drive of the ramp unit (e.g. of the frequency ramp parameter or frequency modulation parameter) can be checked or tested by the following comparison of the calculated hash values with the expected hash value. A discrepancy may presuppose a malfunction in the control or drive of the ramp unit or the function of the ramp unit. The system may be brought in a safe state, if a discrepancy is detected.

A correct control of the frequency divider by the ramp unit provides an improved functional safety of the device, for example. The proposed concept can be easily and efficiently implemented in order to provide the functional safety. In this connection, an aspect is the application of a hash value generator and a comparison unit.

In one example, a cyclic redundancy code CRC16 may be used providing a probability for detecting an error of more than 99.99%, for example.

Alternatively, the ramp unit may be implemented redundantly and the outputs may be compared. In this way, the correctness of the control signals of the ramp units may not be checked. Optionally, also the blocks (circuits) for providing the control signals (e.g. at least one frequency modulation parameter) may be implemented with redundancy or twice.

By using a proposed device, a phase locked loop with improved functional safety may be provided. For example, for generating a frequency modulation required for a frequency modulated continuous wave radar (FMCW), a frequency ramp generator (ramp unit or frequency control unit) for controlling the frequency divider of the closed loop of the PLL may be used. A function of the ramp unit is the implementation of a predefined or given frequency ramp parameter in a suitable control signal for the frequency divider within the PLL-closed loop, for example.

Some embodiments relate to a frequency modulated continuous wave radar system comprising a frequency signal generator according to the proposed concept or one or more embodiments described above.

Some embodiments relate to an apparatus for generating a frequency signal. The apparatus comprises a means for generating a frequency signal, a means for controlling a variation of the frequency of the frequency signal and a means for generating an error signal. The means for controlling a variation of the frequency is connected to the means for generating a frequency signal and the means for generating an error signal. The means for generating a frequency signal generates and provides a frequency signal based on a reference frequency signal so that the phase of the frequency signal is aligned to a phase of the reference frequency signal. The means for controlling a variation of the frequency of the frequency signal generates a frequency control signal and the means for generating a frequency signal varies a frequency of the frequency signal based on the frequency control signal. Further, the means for generating an error signal receives the frequency control signal and detects an error within the frequency control signal. Additionally, the means for generating an error signal provides an error signal comprising information on a detected error.

Figure 3:
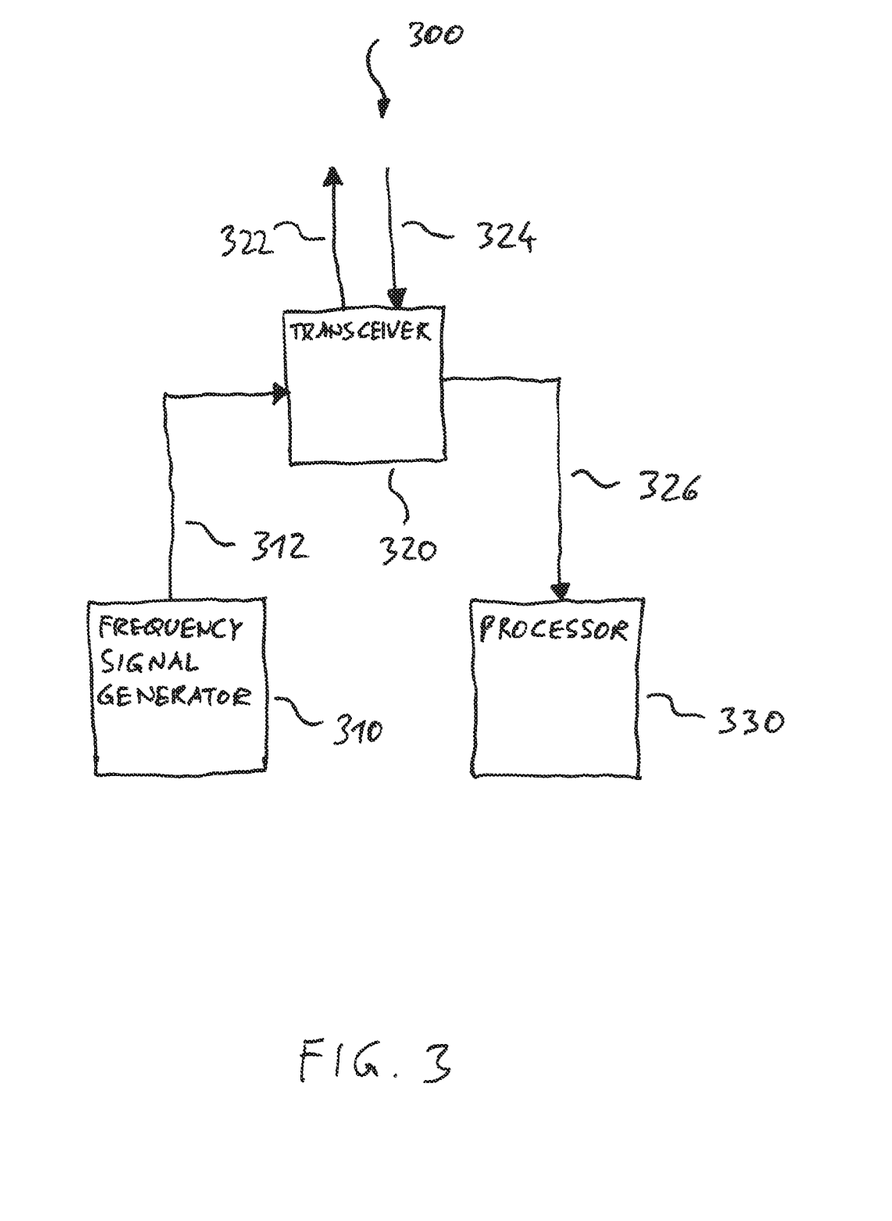
FIG. 3 shows a block diagram of a frequency modulated continuous wave radar system.

The apparatus may comprise further optional features corresponding to one or more aspects mentioned in connection with the proposed concept or one or more embodiments described above. FIG. 3 shows a block diagram of a frequency modulated continuous wave radar system 300 according to embodiments. The frequency modulated continuous wave radar system 300 comprises a frequency signal generator 310 according to the proposed concept or one or more embodiments described above connected to a transceiver 320 and a processor 330 connected to the transceiver 320. The frequency signal generator 310 provides a frequency signal 312 to the transceiver 320. The transceiver 320 transmits the frequency signal 322 (e.g. to a region in front of a vehicle). Further, the transceiver 320 is able to receive a reflected signal 324 caused by a reflection of the frequency signal 322 by an object (e.g. another vehicle in front of the vehicle with the radar system). The reflected signal 324 or a processed reflected signal 326 (e.g. by down conversion) may be provided to the processor 330. The processor 330 may calculate a distance, an angle or a relative velocity of the object reflecting the transmit signal 322, for example.

The frequency signal generator 310 of the frequency modulated continuous wave radar system 300 may comprise one or more further optional features corresponding to one or more aspects mentioned in connection with the proposed concept or one or more embodiments described above.

Figure 4:
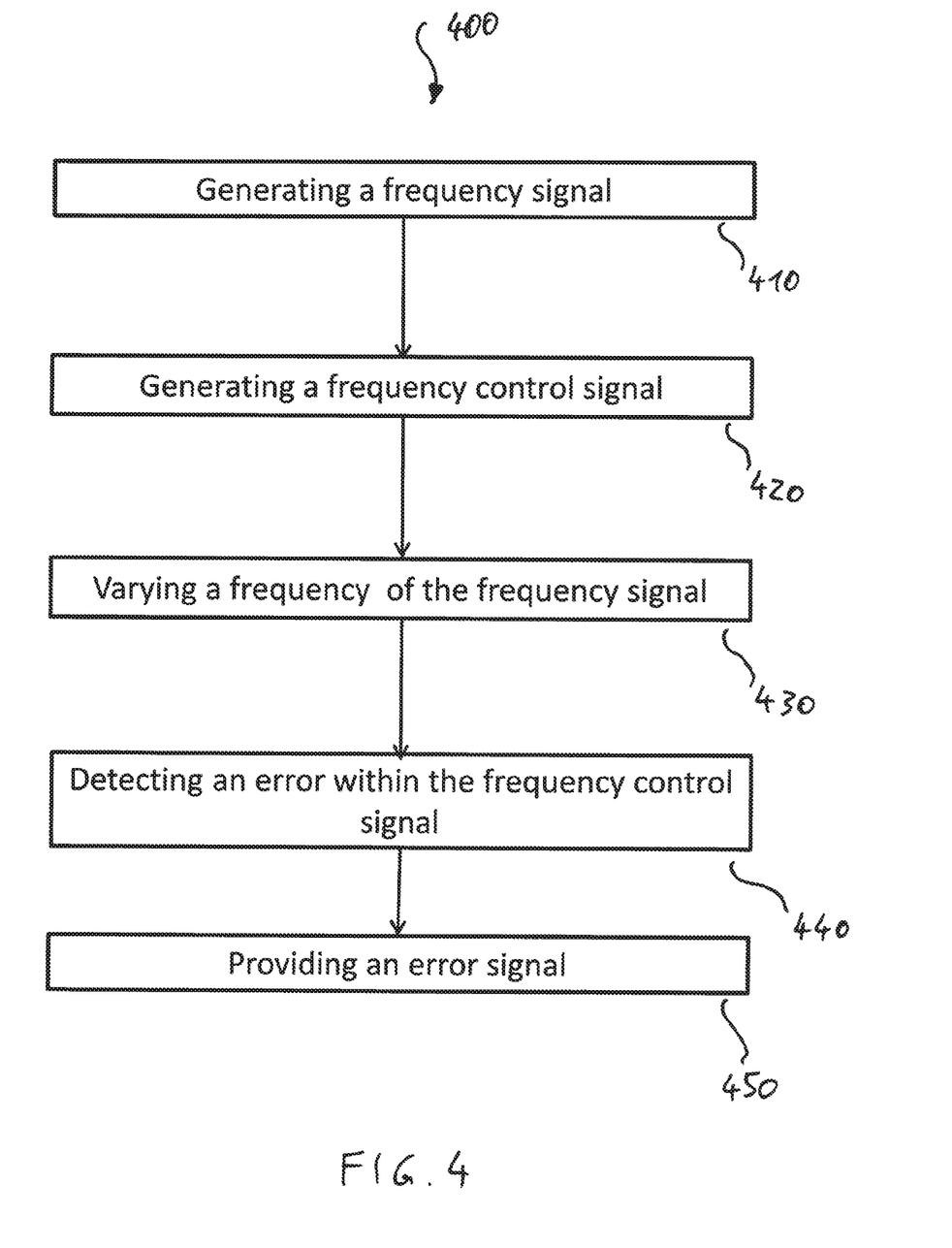
FIG. 4 shows a flow chart of a method for generating a frequency signal.

FIG. 4 shows a flow chart of a method 400 for generating a frequency signal according to an embodiment. The method 400 comprises generating 410 a frequency signal. Further, the method 400 comprises generating 420 a frequency control signal and varying 430 a frequency of the frequency signal based on the frequency control signal. Additionally, the method 400 comprises detecting 440 an error within the frequency control signal and providing 450 an error signal comprising information on a detected error.

In this way, a frequency signal can be provided with high reliable frequency behavior. The method 400 may comprise one or more further optional acts corresponding to one or more aspects mentioned in connection with the proposed concept or one and more embodiments described above.

Embodiments may further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons.

Furthermore, in some embodiments a single act may include or may be broken into multiple sub acts. Such sub acts may be included and part of the disclosure of this single act unless explicitly excluded.

The invention claimed is:

1. A method for operating a Radio Frequency (RF) signal generator, comprising:
    generating a first signal having a first frequency;
    generating frequency control information based on a frequency modulation parameter, the frequency control information indicating a division factor;
    generating reference comparison information;
    providing the frequency control information to a frequency divider circuit;
    generating comparison information based on the provided frequency control information;
    generating a second signal having a second frequency based on the first signal and the provided frequency control information, the second frequency corresponding to the first frequency divided by the division factor;
    comparing the second signal to a reference clock signal and generating a deviation signal;
    generating the first signal having a modified first frequency based on the deviation signal;
    comparing the comparison information with the reference comparison information; and
    determining a safe operation state of the RF signal generator based on the comparing.

2. The method of claim 1, wherein generating the first signal comprises employing a controllable oscillator circuit to generate the first signal based on an input oscillator control signal that is related to the frequency control information.

3. The method of claim 2, wherein the input oscillator control signal comprises a low pass filtered version of the deviation signal.

4. The method of claim 1, wherein generating comparison information comprises inputting the frequency control information to a hash value generator circuit configured to generate a characteristic hash value based on the frequency control information, wherein the characteristic hash value comprises the comparison information.

5. The method of claim 4, wherein generating reference comparison information comprise selecting an expected characteristic hash value associated with frequency control information from a memory.

6. The method of claim 5, wherein comparing the comparison information with the reference comparison information comprises using a comparator circuit to compare the generated characteristic hash value output from the hash generator circuit with the expected characteristic hash value from the memory.

7. The method of claim 1, wherein comparing the second signal to the reference clock signal comprises using a phase detection circuit to output the deviation signal based on a phase relationship between the second signal and the reference clock signal.

8. The method of claim 7, wherein the deviation signal represents an amount of phase difference or error between the second signal and the reference clock signal.

9. A method for operating a Radio Frequency (RF) signal generator, comprising:
generating a first signal having a first frequency;
generating a frequency control signal based on a frequency modulation parameter, the frequency control signal indicating a division factor;
generating a reference comparison signal;
providing the frequency control signal to a frequency divider;
generating a comparison signal based on the provided frequency control signal;
generating a second signal having a second frequency based on the first signal and the provided frequency control signal, the second frequency corresponding to the first frequency divided by the division factor;
comparing the second signal to a reference clock signal and generating a deviation signal;
generating the first signal having a modified first frequency based on the deviation signal;
comparing the comparison signal with the reference comparison signal; and
determining a safe operation state of the RF signal generator based on the comparing.

10. The method of claim 9, wherein generating the first signal comprises employing a controllable oscillator circuit to generate the first signal based on an input oscillator control signal that is related to the frequency control signal.

11. The method of claim 10, wherein the input oscillator control signal comprises a low pass filtered version of the deviation signal.

12. The method of claim 9, wherein generating a comparison signal comprises inputting the frequency control signal to a hash value generator circuit configured to generate a characteristic hash value based on the frequency control signal, wherein the characteristic hash value comprises the comparison signal.

13. The method of claim 12, wherein generating a reference comparison signal comprises selecting an expected characteristic hash value associated with frequency control signal from a memory.

14. The method of claim 13, wherein comparing the comparison signal with the reference comparison signal comprises using a comparator circuit to compare the generated characteristic hash value output from the hash generator circuit with the expected characteristic hash value from the memory.

15. The method of claim 9, wherein comparing the second signal to the reference clock signal comprises using a phase detection circuit to output the deviation signal based on a phase relationship between the second signal and the reference clock signal.

16. The method of claim 15, wherein the deviation signal represents an amount of phase difference or error between the second signal and the reference clock signal.

17. A Radio Frequency (RF) signal generator, comprising:
a controllable oscillator configured to generate a first signal having a first frequency;
a divider circuit configured to generate a second signal based on the first signal and frequency control information provided to the divider circuit;
a frequency control circuit configured to generate the frequency control information based on a modulation parameter and provide the frequency control information to the divider circuit, the frequency control circuit further configured to generate reference comparison information;
a phase detector circuit configured to generate a deviation signal based on the second signal and a reference clock;
a detection circuit configured to generate comparison information based on the frequency control information and configured to generate information indicating a safe operation state of the RF signal generated based on comparing the comparison information with the reference comparison information.

18. The RF signal generator of claim 17, wherein the detection circuit comprises:
a hash value generator circuit configured to generate a characteristic hash value based on the frequency control information and output the characteristic hash value as the comparison information; and
a comparison circuit configured to compare the comparison information with the reference comparison information and output a comparison result based thereon.

19. The RF signal generator of claim 18, wherein the comparison result comprises a YES/NO result on whether the safe operation state exists.

20. The RF signal generator of claim 18, wherein the comparison result comprises substantive content on a failure type when the comparison information and the reference comparison information do not match.

* * * * *